United States Patent
Tan et al.

(10) Patent No.: US 12,392,318 B2
(45) Date of Patent: Aug. 19, 2025

(54) SEGMENTED BLADE MODULE STRUCTURE AND MOLDING METHOD THEREOF

(71) Applicant: NEWTECH GROUP CO., LTD., Changzhou (CN)

(72) Inventors: Kunlun Tan, Changzhou (CN); Yelin Liu, Changzhou (CN); Jian Zhang, Changzhou (CN); Ning Li, Changzhou (CN); Lei Cao, Changzhou (CN); Juncheng Chen, Changzhou (CN)

(73) Assignee: NEWTECH GROUP CO., LTD., Jiangsu (CN)

( * ) Notice: Subject to any disclaimer, the term of this patent is extended or adjusted under 35 U.S.C. 154(b) by 0 days.

(21) Appl. No.: 18/827,683

(22) Filed: Sep. 7, 2024

(65) Prior Publication Data

US 2024/0426272 A1    Dec. 26, 2024

Related U.S. Application Data

(63) Continuation of application No. PCT/CN2023/124314, filed on Oct. 12, 2023.

(30) Foreign Application Priority Data

Mar. 20, 2023  (CN) .................. 202310267132.X

(51) Int. Cl.
*F03D 1/06* (2006.01)
*B29D 99/00* (2010.01)

(52) U.S. Cl.
CPC ....... *F03D 1/0677* (2023.08); *B29D 99/0003* (2013.01); *F03D 1/0681* (2023.08); *F05B 2260/301* (2013.01)

(58) Field of Classification Search
CPC .... F03D 1/0675; F03D 1/0677; F03D 1/0679; F03D 1/0681; F05B 2240/302; F05B 2280/702
See application file for complete search history.

(56) References Cited

U.S. PATENT DOCUMENTS 7,334,989 B2 *  2/2008  Arelt .................. F03D 1/0675
                                         416/229 R
8,500,409 B2 *  8/2013  Baker .................. B29C 70/304
                                         416/226

(Continued)

FOREIGN PATENT DOCUMENTS

CN     107850042 A  *  3/2018  .......... F03D 1/0675
CN     113787658 A     12/2021
(Continued)

OTHER PUBLICATIONS

DE 102012111219—English Translation (Year: 2012).*
CN_107850042—English Translation (Year: 2018).*
ES_2385726—English Translation (Year: 2012).*

*Primary Examiner* — Brian P Wolcott
(74) *Attorney, Agent, or Firm* — SZDC Law PC

(57) ABSTRACT

A segmented blade module structure and a molding method thereof are disclosed. The blade module includes a blade shell, a beam and a web provided in the blade shell, and the beam comprises a connecting beam, a trailing edge beam and an auxiliary beam plate, and a connecting structure is provided at an end of the connecting beam. The beam and the web integrally formed of composite materials constitute a bearing frame that forms a contour shape conforming to the blade, and the blade shell is formed by a skin wrapped on the bearing frame. The auxiliary beam plate is arranged corresponding to the area from the middle portion to the trailing edge portion of the blade shell to ensure that there is sufficient contact area between the beam and the blade shell (Continued)

to avoid instability of the blade shell, ensuring the structural stability of the segmented blade module.

7 Claims, 8 Drawing Sheets

(56) References Cited

U.S. PATENT DOCUMENTS

| | | | | |
|---|---|---|---|---|
| 9,506,452 | B2 * | 11/2016 | Bakhuis | F03D 13/10 |
| 9,951,751 | B2 * | 4/2018 | Yarbrough | F03D 1/0675 |
| 11,015,573 | B2 * | 5/2021 | Bech | B29C 70/48 |

FOREIGN PATENT DOCUMENTS

| | | | | |
|---|---|---|---|---|
| CN | 115573854 A | | 1/2023 | |
| CN | 115977867 A | | 4/2023 | |
| DE | 102012111219 A1 * | | 5/2014 | F03D 1/0675 |
| ES | 2385726 A1 * | | 7/2012 | F03D 13/10 |
| WO | 2020119874 A1 | | 6/2020 | |

\* cited by examiner

SEGMENTED BLADE MODULE STRUCTURE AND MOLDING METHOD THEREOF

This application is a Continuation application of PCT/CN2023/124314, filed on Oct. 12, 2023, which claims priority to Chinese Patent Application No. 202310267132.X, filed on Mar. 20, 2023, which is incorporated by reference for all purposes as if fully set forth herein.

TECHNICAL FIELD

The present invention relates to the technical field of wind turbine blades, in particular to a segmented blade module structure and a molding method thereof.

BACKGROUND

As a renewable energy, wind energy has the advantages of low development cost, mature technology, and wide distribution, making it a key direction for the development of renewable energy. In order to fully utilize wind energy resources, the improvement of the aerodynamic shape of wind turbine blades and the increase of blade size are important means to increase the power generation of wind turbines. Therefore, the gradual move towards large-scale wind turbines is a trend in the development of wind power technology. However, areas rich in wind resources are often remote and inaccessible areas with poor transportation conditions which limit the large-scale wind turbines.

At present, wind turbine blades are generally manufactured using fiber-reinforced polymer based composite materials. The production process of composite blades has strict environmental and process requirements, and the composite materials used in ultra long blades are more sensitive to production conditions, making it difficult to control blade quality. As such, when the blade length reaches a certain limit, it is an effective method to solve the problem of large-scale wind turbines by adopting segmented blade structure, characterized by production in existing factories, transportation in segments and assembly on site. However, as the blade size increases, the overweight blade structure is not conducive to maintaining stable operation when the wind turbine is running. Therefore, ensuring the structural performance of the blade while reducing the weight and cost of the blade has become another technical problem in the development of wind power technology.

SUMMARY

The present invention provides a segmented blade module structure and a molding method thereof to effectively solve the problems discussed above.

To this end, the present invention adopts technical solutions described below.

A segmented blade module structure comprises a blade shell, a beam and a web provided in the blade shell, wherein the blade shell comprises a windward surface and a leeward surface that are integrally provided, the beam is attached to the blade shell and supports the windward surface and leeward surface by the web.

The blade shell is provided along its chord length direction in form of a leading edge portion, a middle portion, and a trailing edge portion, and the beam comprises a connecting beam, a trailing edge beam, and an auxiliary beam plate, wherein the connecting beam is provided corresponding to a middle portion of the windward surface and the leeward surface, the trailing edge beam is provided corresponding to the trailing edge portion, and the auxiliary beam plate is embedded at a notch portion of the connecting beam as well as between the connecting beam and the trailing edge beam.

A connection structure is provided at one end of the connecting beam, and two adjacent blade modules are fixedly connected by a connecting piece provided in the connection structure.

Further, the web is provided along the axial direction of the blade shell, and a plurality of the webs is provided in the chord direction of the blade shell.

The web is provided in an I-shaped structure and comprises a supporting vertical plate and connecting plates on both sides thereof, wherein the connecting plates and the supporting vertical plate are provided at a preset inclination angle and are adapted to the arc surface of the blade shell.

Further, the two connecting plates of the web located at the leading edge portion abut with the inner sides of the windward surface and the leeward surface respectively, and the two connecting plates of the web located at the middle portion abut with the two connecting beams respectively.

Further, the connecting plates are fixedly connected to the blade shell or the connecting beam by a structural adhesive.

Further, the connecting beam is provided in one piece, comprising a ring beam and a main spar cap and an auxiliary spar cap arranged on the same side thereof, wherein both the main spar cap and the auxiliary spar cap are provided along the axial direction of blade shell and cooperate with the ring beam to form the notch portion between them.

Further, the connection structure is provided on the ring beam, comprising a plurality of first ring holes and a plurality of second ring holes provided along the circumferential direction of the blade shell, wherein the first and second ring holes are staggered, the first ring hole is closer to an end face of the ring beam, the first ring hole is provided in form of a circular through hole, and the second ring hole is provided in form of a gourd shaped through hole.

The first ring hole and the second ring hole are communicated with a first axial hole and a second axial hole respectively, and both the first axial hole and the second axial hole are provided on the end face of the ring beam and are axially extended along the blade shell.

Further, the connecting piece comprises a cylindrical nut, a double-headed bolt, a semi-cylindrical spacer and a round nut. The cylindrical nut and the semi-cylindrical spacer are disposed in the first ring hole and the second ring hole respectively.

The double-headed bolt is disposed in the first axial hole and the second axial hole respectively, with one end of the double-headed bolt screwed to the cylindrical nut, or screwed to the round nut passing through the semi-cylindrical spacer.

Further, a T-shaped beam is provided between two adjacent auxiliary beam plates provided along the circumferential direction of the blade shell, wherein the T-shaped beam is fixedly connected to the two auxiliary beam plates through a horizontal plate perpendicular to its longitudinal plate.

A lap is provided on the side of the auxiliary beam plate facing the blade shell corresponding to the horizontal plate. The lap is concave towards its side away from the blade shell by a depth adapted to the thickness of the horizontal plate.

A method for molding segmented blade module structure applied to the segmented blade module structure described above comprises the following steps:

prefabricating a connecting beam, a trailing edge beam, an auxiliary beam plate and a web respectively using composite materials, assembling the auxiliary beam plate to a notch portion of the connecting beam and bonding it on both sides of the web to form a middle support, and arranging the web provided corresponding to the leading edge portion of the blade along the axial direction of the blade to form a leading edge bracket;

arranging the leading edge bracket, the middle bracket and the trailing edge beam sequentially along the chord direction of the blade to form a bearing structure, and wrapping a blade shell outside the bearing structure, followed by bonding and fixing the same; and forming a first ring hole and a second ring hole by punching holes in the circumferential direction and the axial direction of the connecting beam, and providing a hatch notch at an end of the blade shell.

Further, in the prefabrication process of the respective beams, the axial length of the connecting beam is configured to be the same with the axial length of the blade shell, and the length of the trailing edge beam is configured to be larger than or smaller than the axial length of the blade shell.

In the assembling process of the middle bracket, a web is provided at the main spar cap and the auxiliary spar cap of the connecting beam respectively.

The advantageous effects of the present invention are explained below.

In the present invention, the beam and the web integrally formed of composite materials constitute the bearing frame, wherein the beam is attached to the inner wall of the blade shell, so that the bearing frame forms a contour shape conforming to the blade, and the blade shell is formed by a skin wrapped on the bearing frame. The auxiliary beam plate, in cooperation with the connecting beam and the trailing edge beam, is arranged corresponding to the area from the middle portion to the trailing edge portion of the blade shell to ensure that there is sufficient contact area between the beam and the blade shell to avoid instability of the blade shell, ensuring the structural stability of the segmented blade module. The bearing frame is made of composite materials, which can ensure the structural stability of the blade module and further realize the lightweight design of the blade module.

The connecting beam is provided between the blade shell and the web, and the surfaces on both sides of the connecting beam are fixedly connected to the web and the blade shell to ensure the structural stability of the connecting beam. The connection structure connecting two adjacent segmented blade modules is provided at the connecting beam to ensure a stable connection of the two blade modules.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Figure 1:
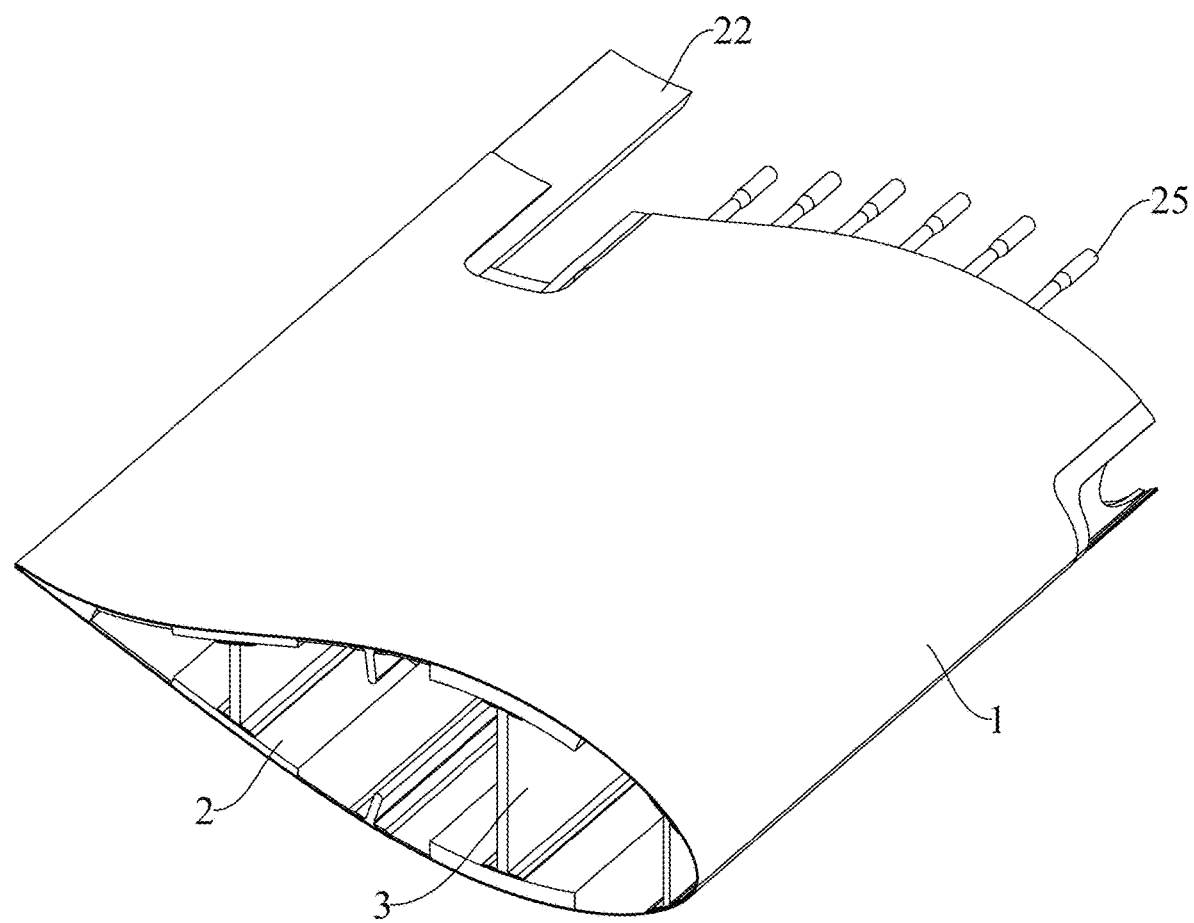
FIG. 1 is a schematic diagram of the structure of the segmented blade module according to an embodiment of the present invention.

REFERENCE SIGNS 1. blade shell; 11. Windward surface; 12. leeward surface; 13. leading edge portion; 14. Middle portion; 15. Trailing edge portion; 16. hatch notch; 2. beam; 21. connecting beam; 211. ring beam; 212. main spar cap; 213. auxiliary spar cap; 214. notch portion; 22. trailing edge beam; 23. auxiliary beam plate; 231. lap; 24. connection structure; 241. first ring hole; 242. second ring hole; 243. first axial hole; 244. second axial hole; 25. Connecting piece; 251. cylindrical nut; 252. double-headed bolt; 253. semi-cylindrical spacer; 254. round nut; 26. T-shaped beam; 261. vertical plate; 262. horizontal board; 3. web; 31. supporting vertical plate; 32. connecting board; 42. middle bracket; 41. leading edge bracket.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

FIGS. 1 to 10 show a segmented blade module structure comprising a blade shell 1, a beam 2 and a web 3 provided in the blade shell. The blade shell 1 comprises a windward surface 11 and a leeward surface 12 that are integrally provided. The beam 2 is attached to the blade shell 1 and supports the windward surface 11 and leeward surface 12 by the web 3. The blade shell 1 is provided along its chord length direction in form of a leading edge portion 13, a middle portion 14, and a trailing edge portion 15, and the beam 2 comprises a connecting beam 21, a trailing edge beam 22, and an auxiliary beam plate 23. The connecting beam 21 is provided corresponding to a middle portion 14 of the windward surface 11 and the leeward surface 12, the trailing edge beam 22 is provided corresponding to the trailing edge portion 15, and the auxiliary beam plate 23 is embedded at a notch portion 214 of the connecting beam 21 as well as between the connecting beam 21 and the trailing edge beam 22. A connection structure 24 is provided at one end of the connecting beam 21, and two adjacent blade modules are fixedly connected by a connecting piece 25 provided in the connection structure 24.

In the present invention, the beam and the web integrally formed of composite materials constitute the bearing frame, wherein the beam 2 is attached to the inner wall of the blade shell 1, so that the bearing frame forms a contour shape conforming to the blade, and the blade shell is formed by a skin wrapped on the bearing frame. The auxiliary beam plate 23, in cooperation with the connecting beam 21 and the trailing edge beam 22, is arranged corresponding to the area from the middle portion 14 to the trailing edge portion 15 of the blade shell 1 to ensure that there is sufficient contact area between the beam 2 and the blade shell 1 to avoid instability of the blade shell 1, ensuring the structural stability of the segmented blade module. The bearing frame is made of composite materials, which can ensure the structural stability of the blade module and further realize the lightweight design of the blade module.

Figure 2:
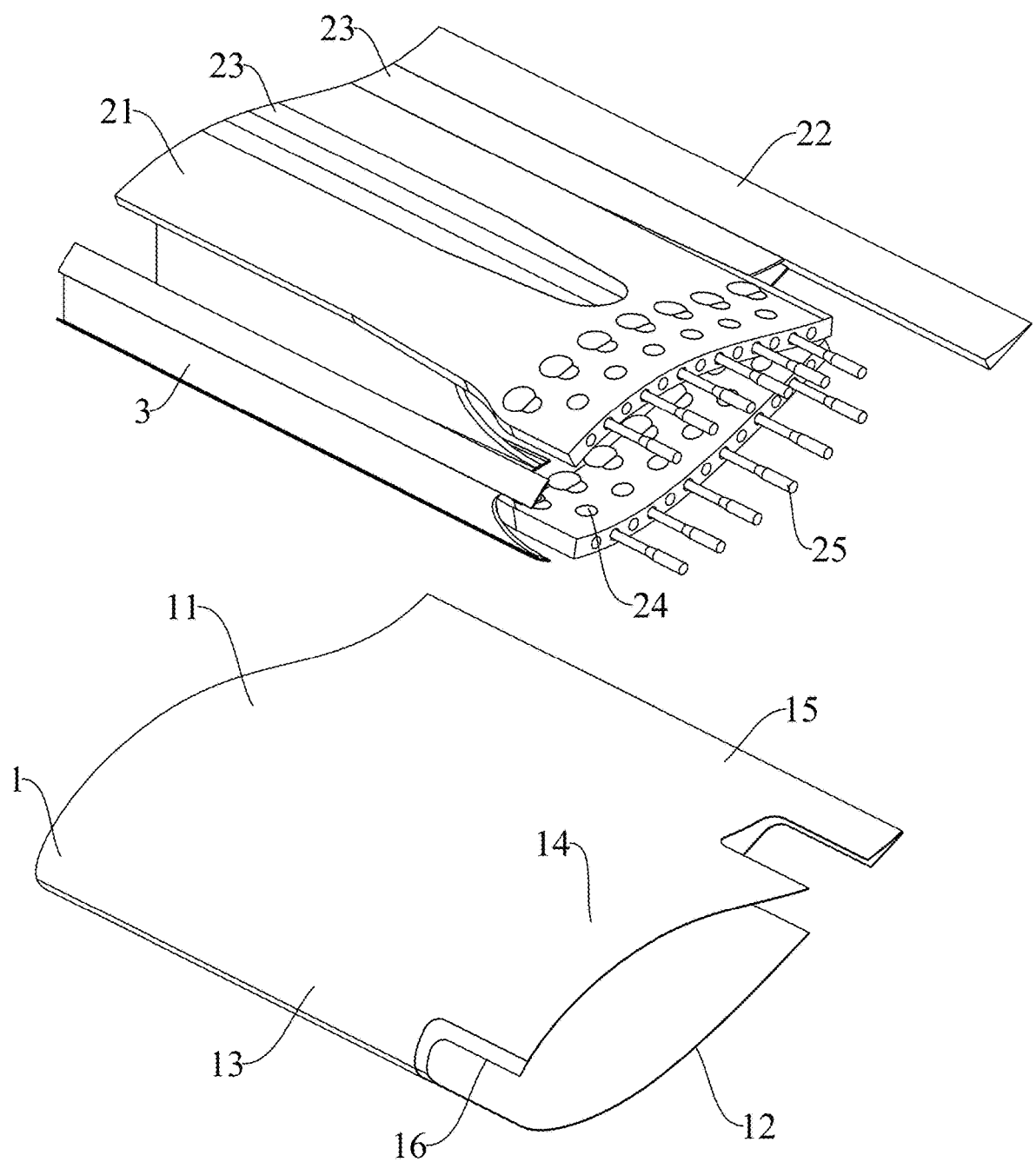
FIG. 2 is a schematic diagram of the structure of the bearing frame and the blade shell according to an embodiment of the present invention.
Figure 3:
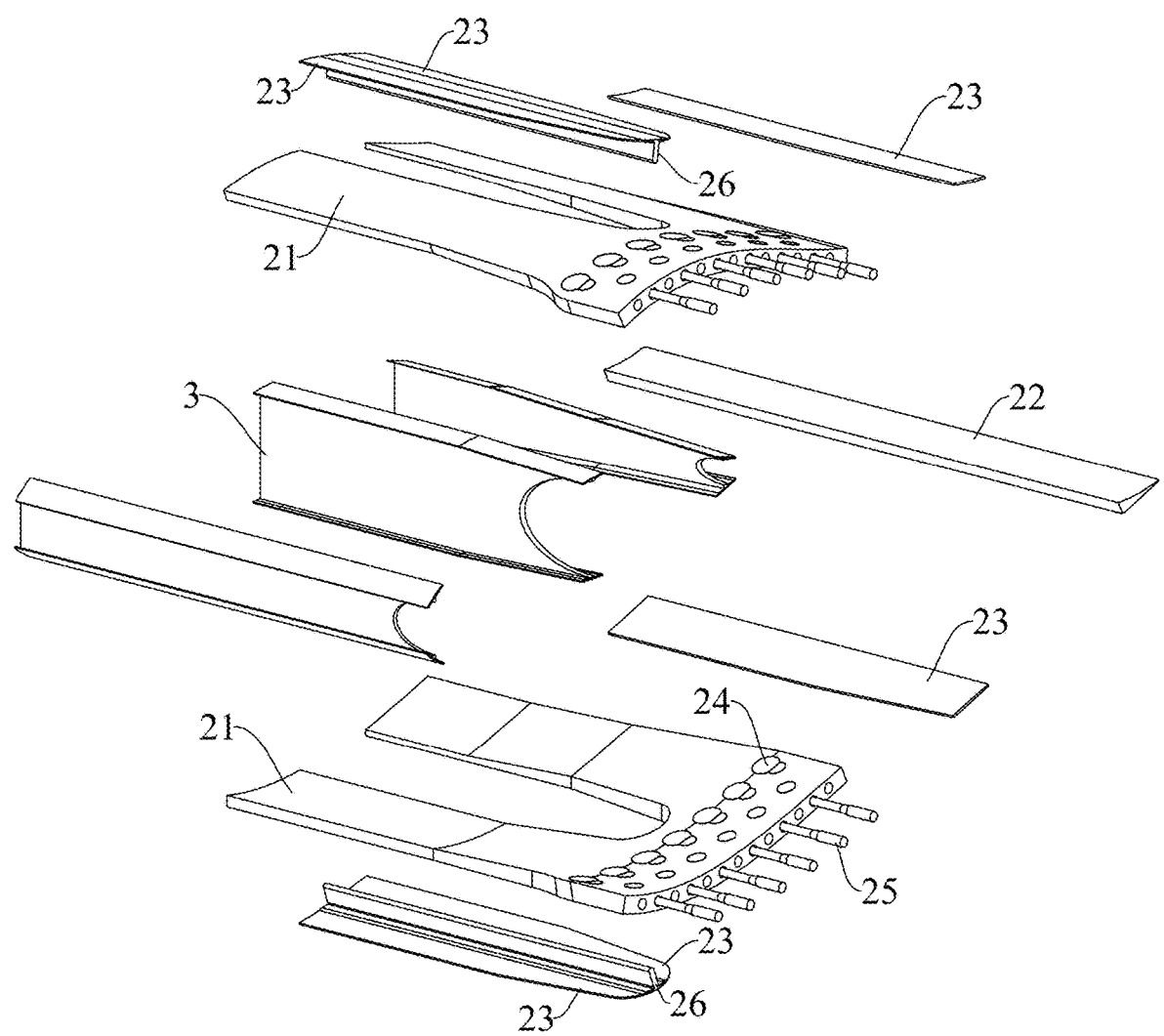
FIG. 3 is a schematic diagram of the explosive structure of the bearing frame according to an embodiment of the present invention.

As shown in FIGS. 1 to 3, the connecting beam 21 is provided between the blade shell 1 and the web 3, and the surfaces on both sides of the connecting beam 21 are fixedly connected to the web 3 and the blade shell 1 to ensure the structural stability of the connecting beam 21. The connection structure 24 connecting two adjacent segmented blade modules is provided at the connecting beam 21 to ensure a stable connection of the two blade modules.

Figure 8:
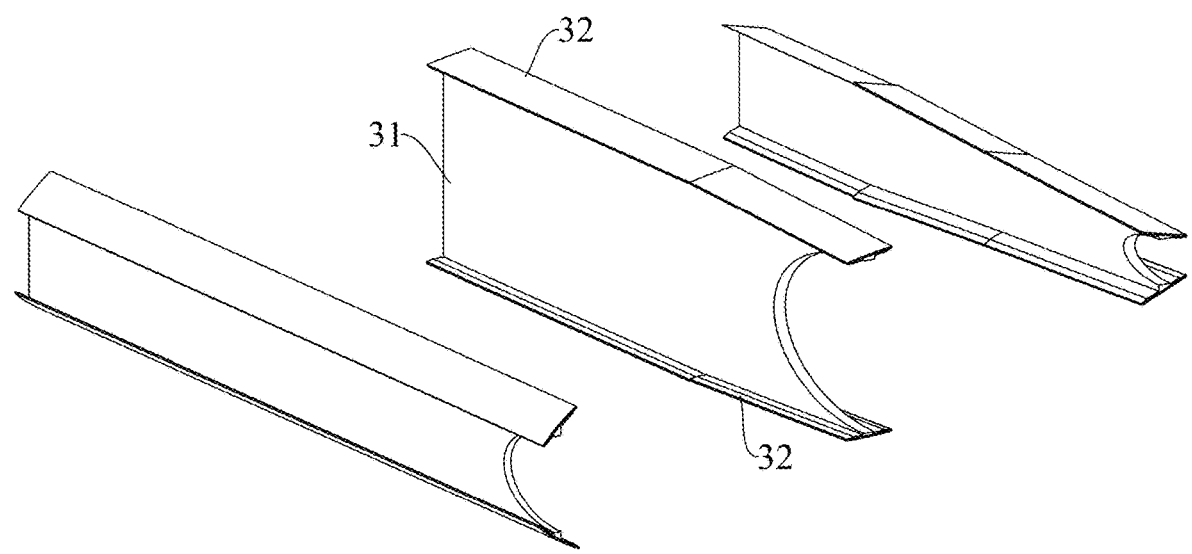
FIG. 8 is a schematic diagram of the structure of the web according to an embodiment of the present invention.

In this embodiment, as shown in FIG. 8, the web 3 is provided along the axial direction of the blade shell, and a plurality of webs 3 is provided in the chord direction of the blade shell 1. The web 3 is provided in an I-shaped structure and comprises a supporting vertical plate 31 and connecting plates 32 on both sides thereof, the connecting plates 32 and the supporting vertical plate 31 are provided at a preset inclination angle and are adapted to the arc surface of the blade shell 1.

Figure 9:
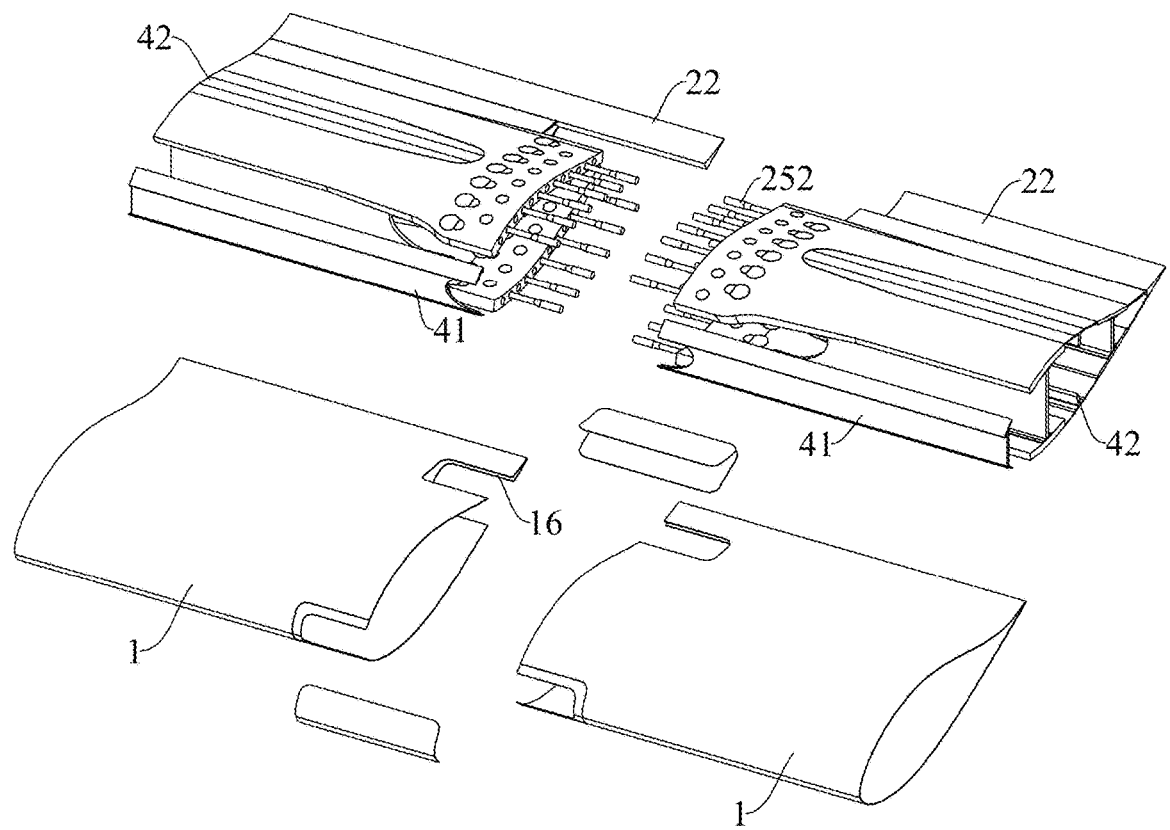
FIG. 9 is a schematic diagram of the connection of two blade modules according to an embodiment of the present invention.
Figure 10:
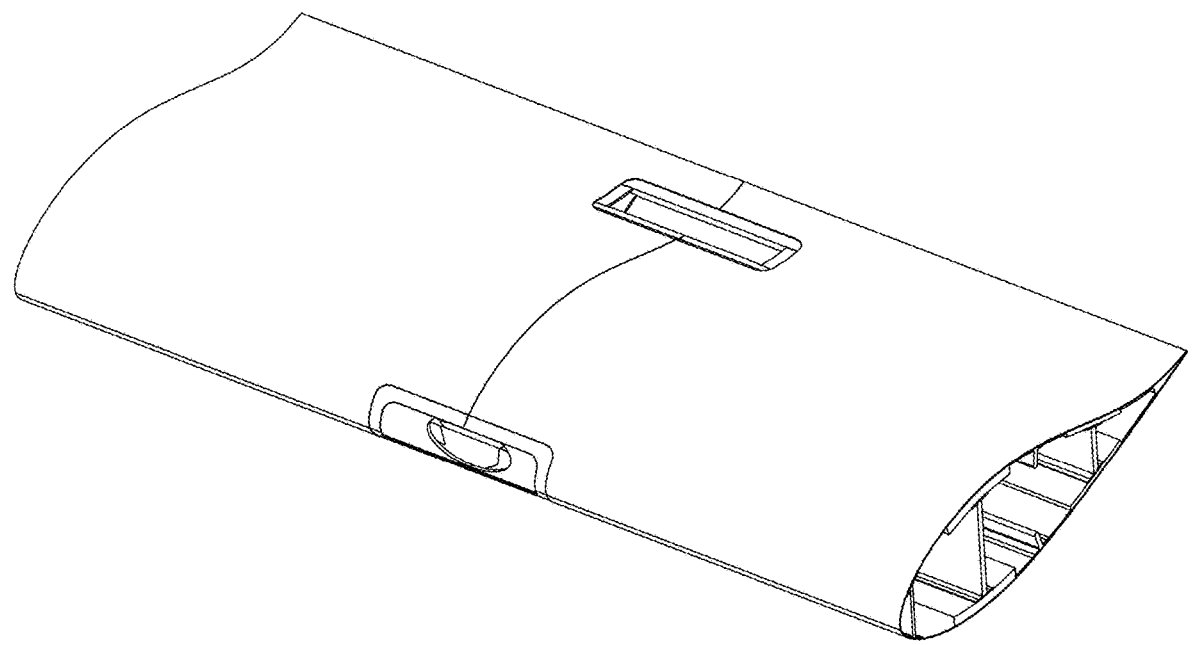
FIG. 10 is a schematic diagram of the connected two blade modules according to an embodiment of the present invention.

Further, as shown in FIG. 9, the two connecting plates 32 of the web 3 located at the leading edge portion 13 abut with the inner sides of the windward surface 11 and the leeward surface 12 respectively, and the two connecting plates 32 of the web 3 located at the middle portion 14 abut with the two connecting beams 21 respectively.

The connecting plates 32 are fixedly connected to the blade shell 1 or the connecting beam 21 by a structural adhesive.

As a preferred embodiment of the structure of the web 3, as shown in FIG. 8, the supporting vertical plate 31 on the web 3 is provided as a straight plate along the blade axis, and an arc groove is provided at one end of the supporting vertical plate 31 close to the connecting end of the blade module, which can eliminate stress concentration at the end of the web 3 and improve the bearing capacity of the web 3.

Figure 4:
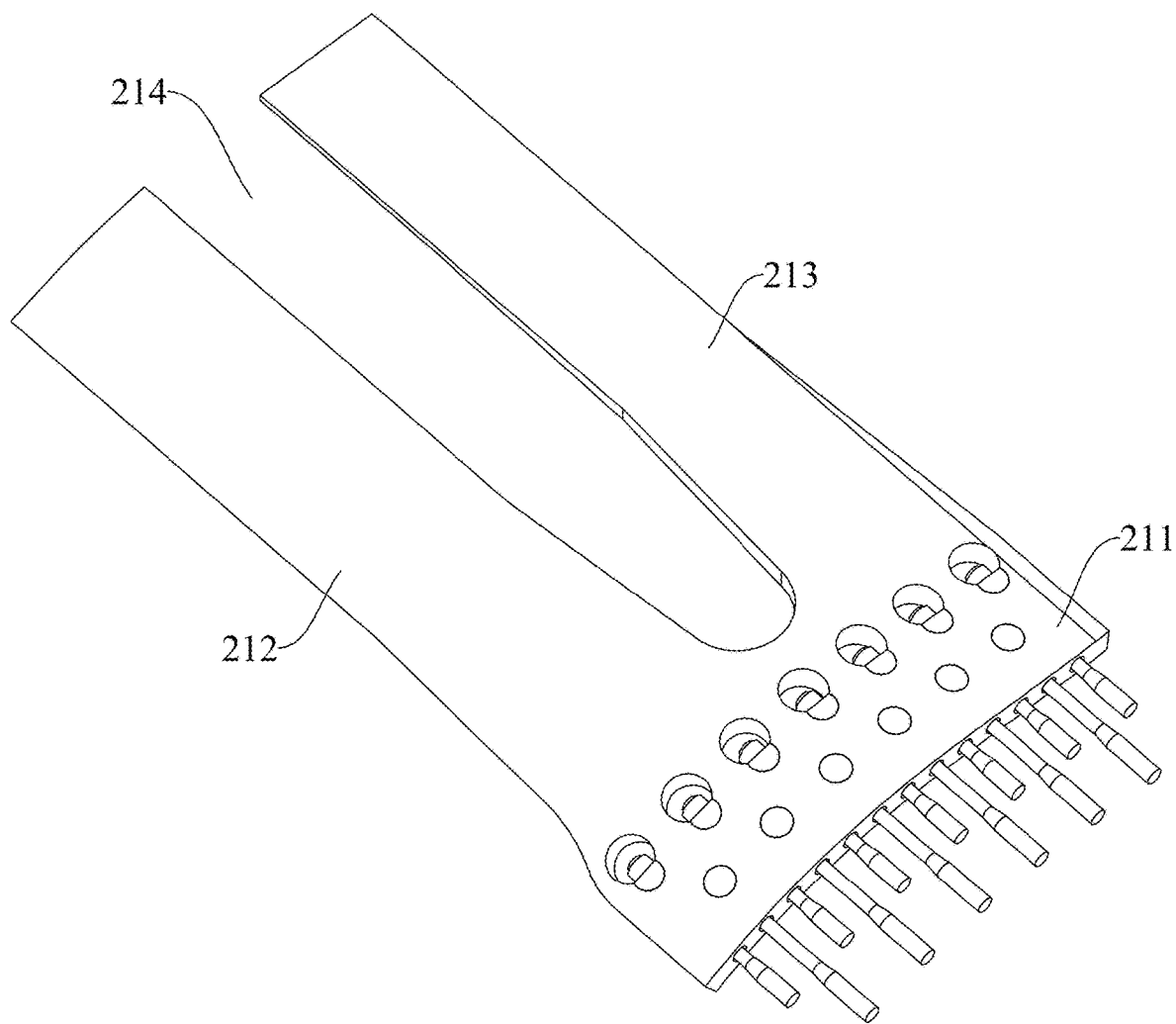
FIG. 4 is a schematic diagram of the structure of the connecting beam according to an embodiment of the present invention.
Figure 5:
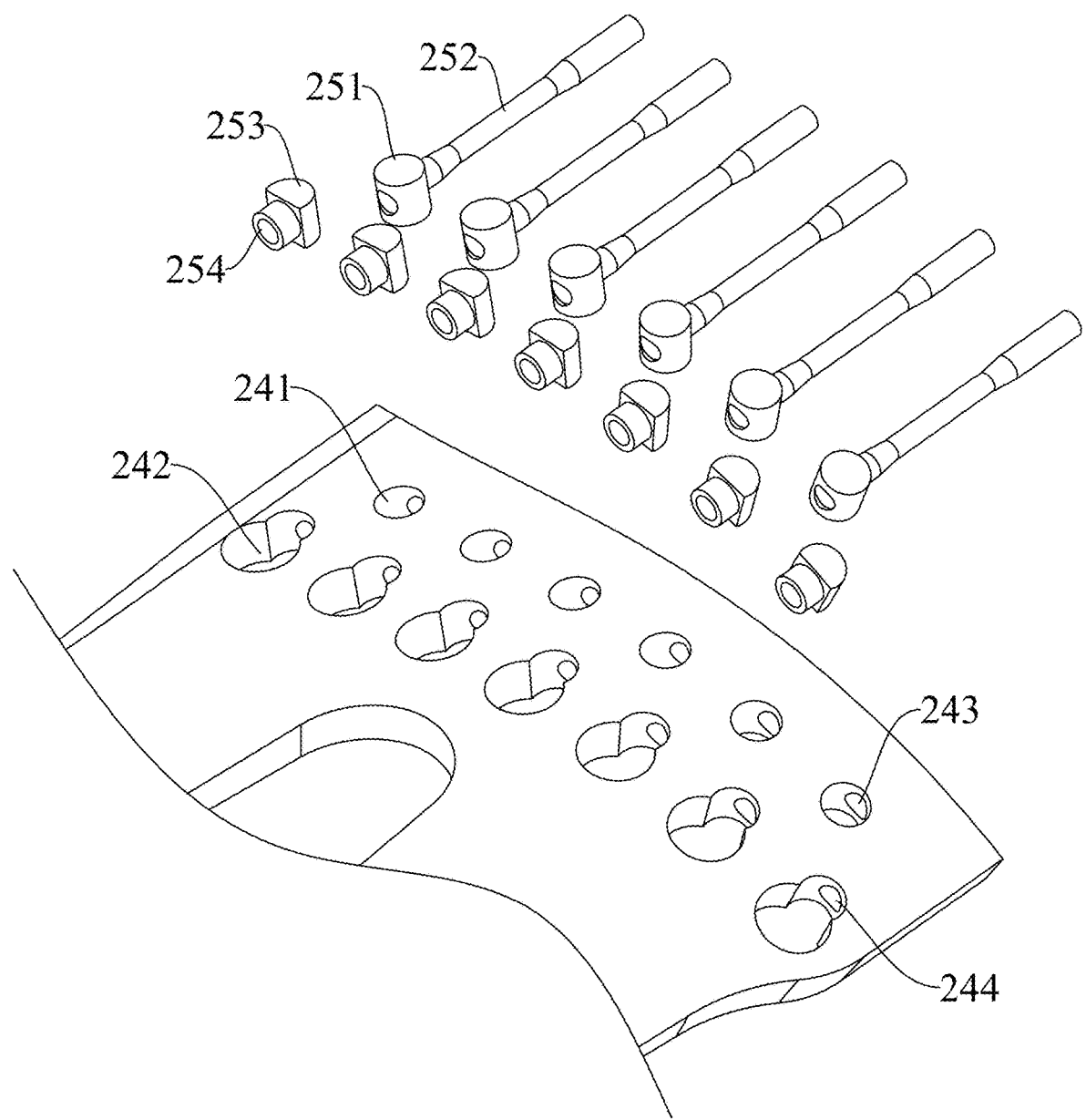
FIG. 5 is a schematic diagram of the installation of the connecting piece and connection structure according to an embodiment of the present invention.

In this embodiment, as shown in FIGS. 4 and 5, the connecting beam 21 is provided in one piece, comprising a ring beam 211 and a main spar cap 212 and an auxiliary spar cap 213 arranged on the same side thereof. Both the main spar cap 212 and the auxiliary spar cap 213 are provided along the axial direction of blade shell 1 and cooperate with the ring beam 211 to form the notch portion 214 between them.

The main spar cap 212 and the auxiliary spar cap 213 are disposed close to the leading edge portion 13 and the trailing edge portion 15 of the blade shell 1 respectively and the thickness of the main spar cap 212 is greater than that of the auxiliary spar cap 213.

Figure 6:
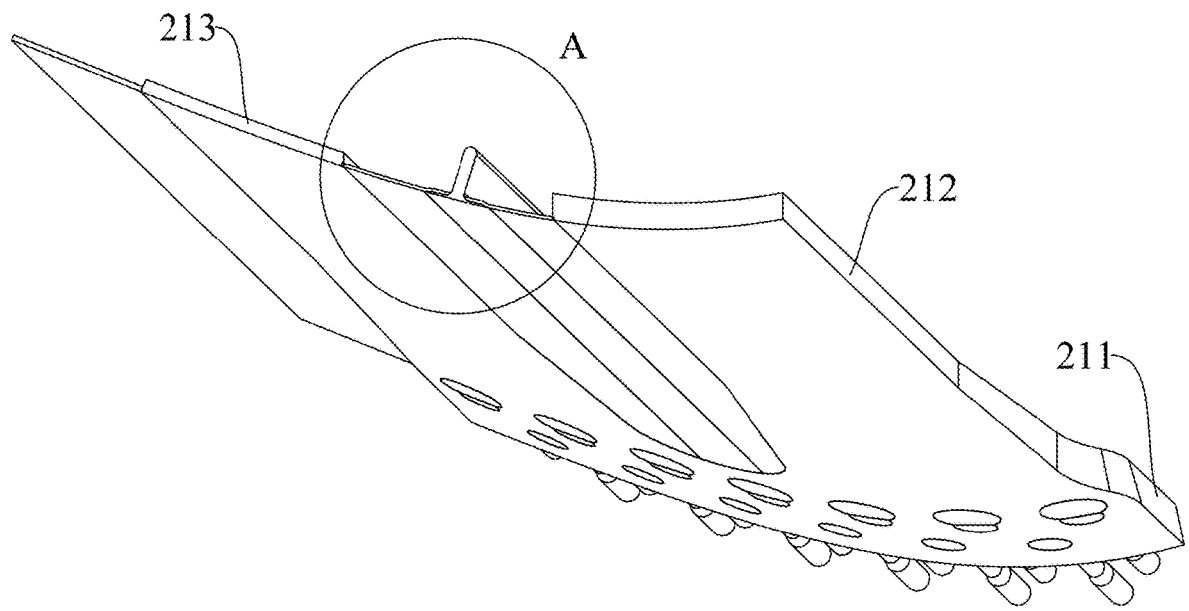
FIG. 6 is a schematic diagram of the structure of a beam on one side of the blade shell according to an embodiment of the present invention.

As shown in FIG. 6, the auxiliary beam plate 23 is also embedded in the notch portion 214 of the connecting beam 21, so that the edge of the connecting beam 21 can abut with the auxiliary beam plate 23 in the circumferential direction of the blade to realize circumferential transmission of the force from the blade shell 1 on the bearing frame, thus ensuring the stress stability of the bearing structure while increasing the contact area between the bearing structure and the blade shell 1 and improving the structural stability of the blade module.

The connection structure 24 is provided on the ring beam 211, comprising a plurality of first ring holes 241 and a plurality of second ring holes 242 provided along the circumferential direction of the blade shell 1. The first and second ring holes 241, 242 are staggered and the first ring hole 241 is closer to an end face of the ring beam 211. The first ring hole 241 is provided in form of a circular through hole, and the second ring hole 242 is provided in form of a gourd shaped through hole.

The first ring hole 241 and the second ring hole 242 are communicated with a first axial hole 243 and a second axial hole 244 respectively, and both the first axial hole 243 and the second axial hole 244 are provided on the end face of the ring beam 211 and are axially extended along the blade shell 1.

The first ring hole 241 and the second ring hole 242 are respectively provided at different circumferential positions of the blade. The first ring hole 241 and the second ring hole 242 are staggered so that the connection structures 24 on two adjacent blade modules are uniformly distributed, thereby avoiding damage on one side of the two connecting beams 21 in the two blade modules and ensuring the bearing capacity of the connecting beams 21.

The connecting piece 25 comprises a cylindrical nut 251, a double-headed bolt 252, a semi-cylindrical spacer 253 and a round nut 254. The cylindrical nut 251 and the semi-cylindrical spacer 253 are disposed in the first ring hole 241 and the second ring hole 242 respectively. The double-headed bolt 252 is disposed in the first axial hole 243 and the second axial hole 244 respectively, with one end of the double-headed bolt 242 screwed to the cylindrical nut 251, or screwed to the round nut 254 passing through the semi-cylindrical spacer 253.

The gourd-shaped through hole facilitates the tightening and fixing of the round nut 254 and the end of the double-headed bolt 252, ensuring that there is no space restriction when using a tool to tighten the round nut 254, making it easy to operate.

Figure 7:
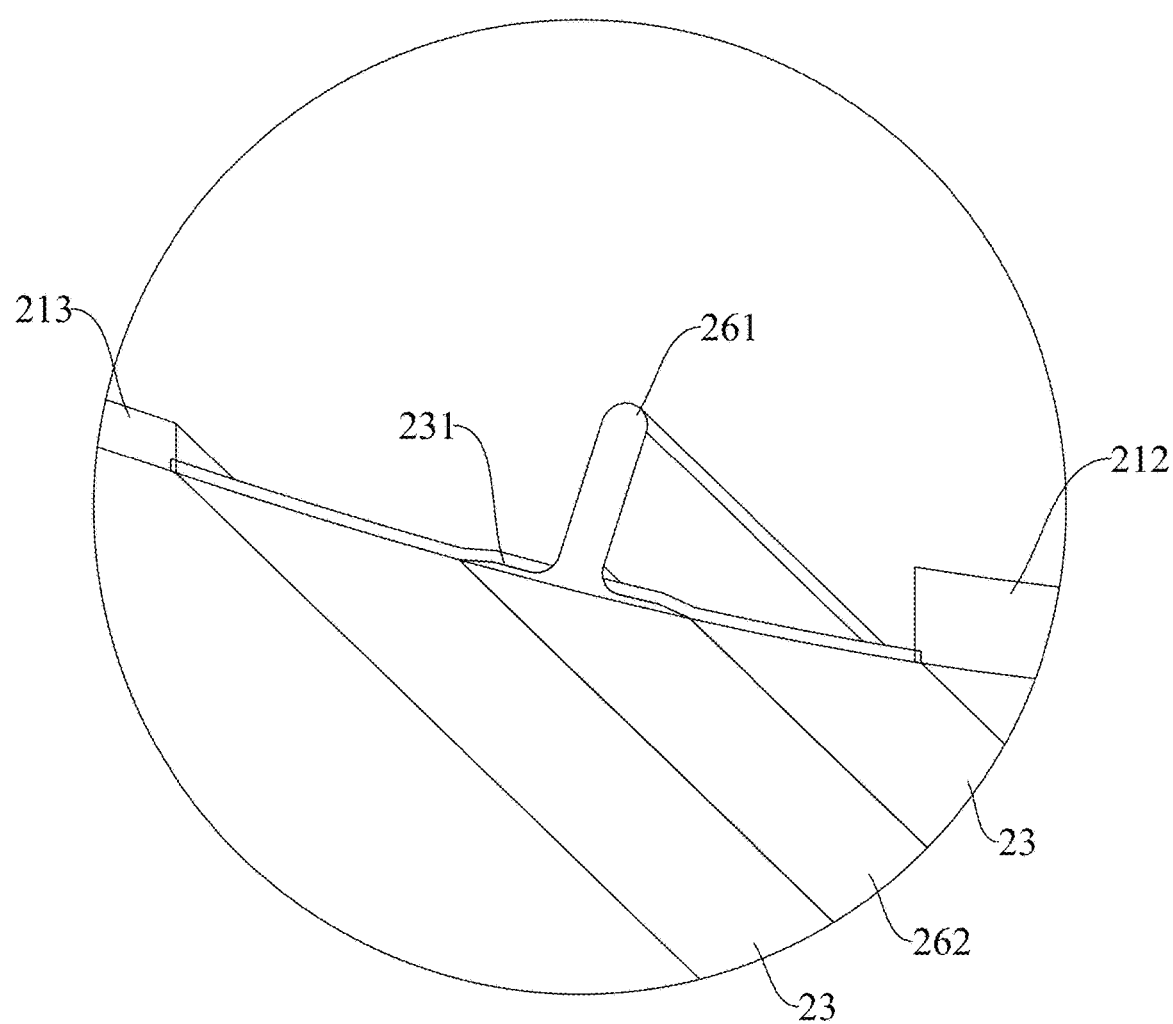
FIG. 7 is an enlarged view of the local structure at point A in in FIG. 6.

As shown in FIG. 7, a T-shaped beam 26 is provided between two adjacent auxiliary beam plates 23 provided along the circumferential direction of the blade shell 1. The T-shaped beam 26 is fixedly connected to the two auxiliary beam plates 24 through a horizontal plate 262 perpendicular to its longitudinal plate 261.

A lap 231 is provided on the side of the auxiliary beam plate 23 facing the blade shell 1 corresponding to the horizontal plate 262. The lap 231 is concave towards its side away from the blade shell 1 by a depth adapted to the thickness of the horizontal plate 262. This ensures that the connection surface between the beam 2 and the blade shell 1 is flat.

A method for molding segmented blade module structure comprises the following steps: prefabricating a connecting beam 21, a trailing edge beam 22, an auxiliary beam plate 23 and a web 3 respectively using composite materials, assembling the auxiliary beam plate 23 to a notch portion 214 of the connecting beam 21 and bonding it on both sides of the web 3 to form a middle support 42, and arranging the web 3 provided corresponding to the leading edge portion 13 of the blade along the axial direction of the blade to form a leading edge bracket 41; arranging the leading edge bracket 41, the middle bracket 42 and the trailing edge beam 22 sequentially along the chord direction of the blade to form a bearing structure, and wrapping a blade shell 1 outside the bearing structure, followed by bonding and fixing the same; and forming a first ring hole 241 and a second ring hole 242 by punching holes in the circumferential direction and the axial direction of the connecting beam 21, and providing a hatch notch 16 at an end of the blade shell 1.

In the prefabrication process of the respective beams 2, the axial length of the connecting beam 21 is configured to be the same with the axial length of the blade shell 1, and the length of the trailing edge beam 22 is configured to be larger than or smaller than the axial length of the blade shell 1.

In the assembling process of the middle bracket 42, a web 3 is provided at the main spar cap 212 and the auxiliary spar cap 213 of the connecting beam 21 respectively.

The trailing edge beam 22 is configured to extend from or retract into the end face of the blade shell 1, and the trailing edge beams 22 in two adjacent blade modules abut with each other at an end thereof, so that during the connection process of the two blade modules, an insertion structure is formed between the trailing edge beam 22 extending from the end face of the blade shell 1 and the trailing edge portion 15 of the other blade shell 1, enhancing the connection strength and stability.

After connection is complete, two hatch notches 16 correspondingly provided on two connected blade modules form a hatch hole that is convenient for people to enter and exit. Adhesive is applied to the flange surface of the hatch hole, and a layer of outer skin is covered and fixed by means of adhesive and rivet to restore the hole to a continuous aerodynamic shape. Then, for the outside of the blade shell 1 in the connection area, two layers of biaxial cloth is laid up along its circumference to strengthen the connection structure 24.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A segmented blade module structure, comprising a blade shell, a beam and a web provided in the blade shell, wherein the blade shell comprises a windward surface and a leeward surface that are integrally provided, wherein the beam is attached to the blade shell and supports the windward surface and leeward surface by the web, wherein the blade shell is provided along its chord length direction in form of a leading edge portion, a middle portion, and a trailing edge portion, wherein the beam comprises a connecting beam, a trailing edge beam, and an auxiliary beam plate, wherein the connecting beam is provided corresponding to a middle portion of the windward surface and the leeward surface, the trailing edge beam is provided corresponding to the trailing edge portion, and the auxiliary beam plate is embedded at a notch portion of the connecting beam as well as between the connecting beam and the trailing edge beam, wherein a connection structure is provided at one end of the connecting beam, and two adjacent blade modules are fixedly connected by a connecting piece provided in the connection structure, and wherein the connecting beam is provided in one piece, comprising a ring beam and a main spar cap and an auxiliary spar cap arranged on the same side thereof, wherein both the main spar cap and the auxiliary spar cap are provided along the axial direction of the blade shell and cooperate with the ring beam to form the notch portion between them.

2. The segmented blade module structure according to claim 1, wherein the web is provided along the axial direction of the blade shell, and a plurality of the webs is provided in the chord direction of the blade shell, and wherein the web is provided in an I-shaped structure and comprises a supporting vertical plate and connecting plates on both sides thereof, wherein the connecting plates and the supporting vertical plate are provided at a preset inclination angle and are adapted to an arc surface of the blade shell.

3. The segmented blade module structure according to claim 2, wherein two of the connecting plates of the web located at the leading edge portion abut with inner sides of the windward surface and the leeward surface respectively, and the two connecting plates of the web located at the middle portion abut with two connecting beams' respectively.

4. The segmented blade module structure according to claim 3, wherein the connecting plates are fixedly connected to the blade shell or the connecting beam by a structural adhesive.

5. The segmented blade module structure according to claim 1, wherein the connection structure is provided on the ring beam, comprising a plurality of first ring holes and a plurality of second ring holes provided along the circumferential direction of the blade shell, wherein the plurality of first and second ring holes are staggered, a first ring hole of the plurality of first ring holes is closer to an end face of the ring beam, the first ring hole of the plurality of first ring holes is provided in form of a circular through hole, and the second ring hole of the plurality of second ring holes is provided in form of a gourd shaped through hole, and wherein the first ring hole of the plurality of first ring holes and the second ring hole of the plurality of second ring holes are communicated with a first axial hole and a second axial hole respectively, and both the first axial hole and the second axial hole are provided on the end face of the ring beam and are axially extended along the blade shell.

6. The segmented blade module structure according to claim 5, wherein the connecting piece comprises a cylindrical nut, a double-headed bolt, a semi-cylindrical spacer and a round nut, the cylindrical nut and the semi-cylindrical spacer disposed in the first ring hole of the plurality of first ring holes and the second ring hole of the plurality of second ring holes respectively, and wherein the double-headed bolt is disposed in the first axial hole and the second axial hole respectively, with one end of the double-headed bolt screwed to the cylindrical nut, or screwed to the round nut passing through the semi-cylindrical spacer.

7. The segmented blade module structure according to claim 1, wherein a T-shaped beam is provided between two adjacent auxiliary beam plates provided along the circumferential direction of the blade shell, wherein the T-shaped beam is fixedly connected to the two auxiliary beam plates through a horizontal plate perpendicular to a longitudinal plate, and wherein a lap is provided on the side of the auxiliary beam plate facing the blade shell corresponding to the horizontal plate, the lap being concave towards its side away from the blade shell by a depth adapted to a thickness of the horizontal plate.

* * * * *